United States Patent [19]

Islam et al.

[11] Patent Number: 6,014,712

[45] Date of Patent: Jan. 11, 2000

[54] NETWORK SYSTEM

[75] Inventors: Farhad Fuad Islam, Marsfield, Australia; Junichi Yamazaki, Atsugi, Japan

[73] Assignee: Hewlett-Packard Company, Palo Alto, Calif.

[21] Appl. No.: 08/856,341

[22] Filed: May 14, 1997

[30] Foreign Application Priority Data

May 21, 1996 [JP] Japan .................................. 8-150399

[51] Int. Cl.[7] ...................................................... G06F 5/01
[52] U.S. Cl. ............................ 709/246; 709/245; 348/441
[58] Field of Search ..................... 395/200.76; 348/441, 348/15; 709/246, 245, 102, 202, 226, 229, 304

[56] References Cited

U.S. PATENT DOCUMENTS

| | | | |
|---|---|---|---|
| 5,442,791 | 8/1995 | Wrabetz et al. | 709/104 |
| 5,473,363 | 12/1995 | Ng et al. | 348/15 |
| 5,727,159 | 4/1996 | Kikinis | 395/200.76 |
| 5,818,537 | 12/1996 | Enokida et al. | 348/441 |

OTHER PUBLICATIONS

"Multipoint Control Units for Audio Visual Systems using Digital Channels up to 2Mbits/s", ITU–T Recommendation: H.231 (93/03).

"System for Establishing Communication between Audio Visual Terminals using Digital Channels up to 2Mbits/sec", ITU–T Recommendation: H.242 (93/03).

"Procedures for Establishing Communication between Three or More Audio Visual Terminals using Digital Channels up to 2Mbits", ITU Recommendation: H.243 (93/03).

"Multi–Media System Control", Draft ITU–T Recommendation: H.245 (95/6).

*Primary Examiner*—Zarni Maung
*Assistant Examiner*—Chuong Ho
*Attorney, Agent, or Firm*—Ian Hardcastle

[57] ABSTRACT

A system information management unit obtains system information from end systems or media data conversion units and sets end system media data compatibility conditions. The media data conversion units obtain this system information from the system information management unit. When media data are transmitted between the end systems, the media data are first converted in accordance with the system information and then sent to receiving end systems.

14 Claims, 2 Drawing Sheets

NETWORK SYSTEM

BACKGROUND OF THE INVENTION

1. Technical Field

The invention relates to network systems, such as a video conferencing system. More particularly, the invention relates to a network system that can decrease the load on each end system, as well as on the network itself, by efficiently sending and receiving media data, where the media data processing capability or the media presentation format differs between the various end systems that are connected to the network.

2. Description of the Prior Art

End systems that are connected to an electronic network typically have different hardware and software processing capabilities for media data, such as video data and audio data. It is usually necessary in a network that includes a first end system which conforms to a first media data processing standard, and that includes a second end system which conforms to a different processing standard, for the end system that is receiving the media data to convert the received media data to a format that is consistent with the receiving end system processing standard.

For example, if a sending end system sends MPEG-2 video data to a receiving end system that does not have an MPEG-2 video processing function, then the receiving end system must first convert the MPEG-2 video data to a local video data format, for example, MPEG-1 video data. The format conversion process must be performed by software that is running on the receiving end system central processing unit or by a video processor in the receiving end system. This conversion step increases the processing load at the receiving end system.

In addition, it is not unusual for the media presentation format (e.g. video display format or audio output format) to differ between sending end systems and receiving end systems. For example, a sending end system may display video at a resolution of 1,024 pixels×800 pixels, while a receiving end system may display video at a resolution of 800 pixels×600 pixels. To display the video in accordance with its display capability, the receiving end system must convert the video data sent by the sending end system (i.e., video having a resolution of 800 pixels×1,024 pixels) to video data at the resolution of the receiving end system (i.e., video having a resolution of 600 pixels×800 pixels). This conversion step also increases the processing load at the receiving end system.

Another factor that affects media data transfer between a sending end system and a receiving end system is network throughput. Thus, it is often a result that the actual display of video can be significantly delayed when network conditions deteriorate. This is because the receiving end system must wait for a sufficient amount of the video information to arrive via the network if the video is to be displayed at the same resolution as under normal network conditions. This problem is particularly pronounced if the end system is a multitasking system, where network propagation delays result in a decrease in the rate at which the media data are received, and where such decreases in reception rate can result in delays in processes within the end system other than those attributable to the conversion process itself.

A further problem arises when the media data are sent by an end system and are received by a plurality of other end systems, where each receiving end system must convert the media data. The conversion efficiency of media data is poor from the perspective of the entire network system because the conversion process must be separately performed at several end systems. In particular, if media data are sent and received in real time among multiple end systems, e.g., as in video conferencing, the load on each end system described above and on the network is increased. Therefore, it is unlikely that real-time output of the media data can be maintained at the receiving end systems.

In conventional network systems, standards conversion of media may take place either in the end systems or in another entity, as defined in ITU-T recommendation H.231. In such a scheme, a capability exchange occurs prior to media conversion. (See ITU-T recommendation H.242.) In such exchange, each end system declares its media handling capabilities to the MCU, e.g., media encoding and decoding formats and relevant bandwidths.

However, in conventional network systems, the media distribution pattern is very rigid and consequently an end user's options for media consumption is severely restricted.

It would be advantageous to provide a system in which media data are efficiently sent and received across a network, especially where user demands for the media data, processing capabilities, and media presentation formats differ among the end systems connected to the network.

SUMMARY OF THE INVENTION

The invention provides a network system that reduces the load on each end system and on the network by efficiently sending and receiving media data, even when user demands for the media data, processing capability, and media presentation format differ at each end system connected to the network.

The invention also provides a multi-point video conferencing system that enables each end system to send and receive video data and audio data efficiently, particularly, when the end systems send and receive video data and audio data in real time.

A network system is provided that includes a media data conversion unit, a plurality of end systems in which each end system is connected to a network across which media data are transmitted through the media data conversion unit from a sending end system to at least one receiving end system, and a system information management unit for acquiring system information from each end system and the media data conversion unit, the system information including user preference information, the media data conversion unit receiving system information for the receiving end system from the system information management unit, the media data conversion unit converting media data from the sending end system into media data that are in accordance with the received system information for the receiving end system for transmission to the at least one receiving end system.

In the network system, the system information may include end system media data processing capability, end system user media presentation requirements, and optionally at least one of media data conversion unit processing capability and media data transmission capability between the end system and the media data conversion unit.

The network system also may include a plurality media data conversion units.

In the network system, the system information management unit may determine the assignment of the end systems to the media data conversion units.

The network system may comprise a multi-point video conferencing system. In the network system the media data may be real-time data containing video data and audio data.

The invention also provides a network system, a method for reducing the load on each end system and on the network by efficiently sending and receiving media data when user demands for the media data, processing capability, and media presentation format differ at each end system connected to the network. The method includes the steps of connecting a plurality of end systems, a system information management unit, and a media data conversion unit to a network, receiving and storing system information for each end system with the system information management unit, the system information including user preference information, obtaining the stored system information from the system information management unit with the media data conversion unit, converting the media data in accordance with the system information when the media data conversion unit receives media data from a sending end system that is managed by the media data conversion unit while transmitting media data between the end systems, and sending converted media data to the receiving end system with the media data conversion unit.

DETAILED DESCRIPTION OF THE INVENTION

Figure 1:
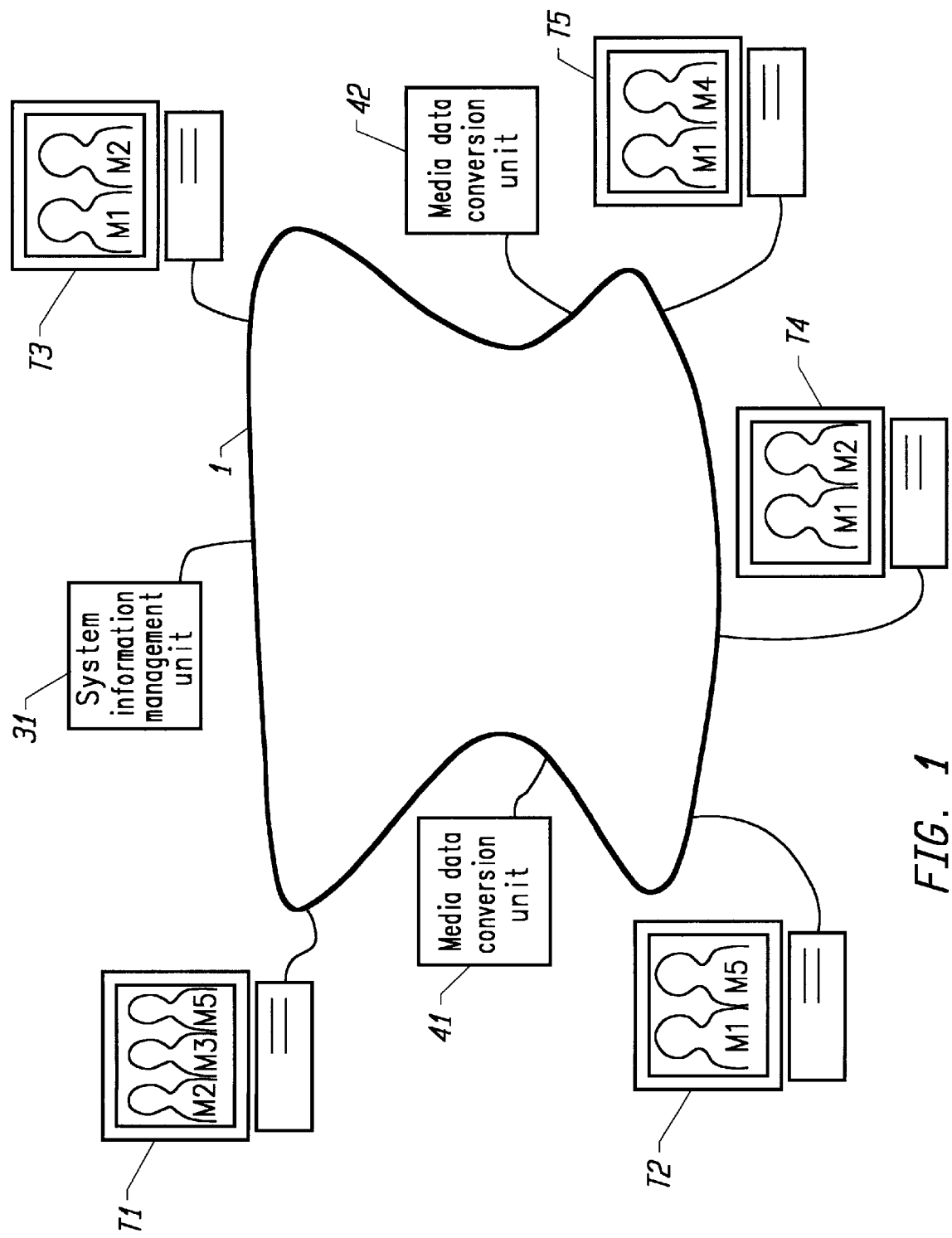
FIG. 1 is a block schematic diagram that shows a network system according to a preferred embodiment of the invention.

The invention provides a network system that reduces loads on both end systems and on the network itself. The invention finds application in a network system that sends and receives data in real time, e.g., a video conferencing system. When the invention is applied to such network system, each end terminal can efficiently send and receive video data and audio data. The invention is also effective at preventing system degradations, such as temporal delays in the output video and output audio.

In the network system, a capability exchange mechanism takes place between the end systems and a system information management unit. The invention involves three components of network heterogeneity. In addition to media handling capabilities, the system information management unit is also provided with information regarding:

Media component preference expressed by each end user. The relative importance of media components are thus assigned by each user; and The priority assigned to each desired media component by an end user.

The above three components of heterogeneity are orthogonal in nature, i.e., each component may very independently and variation of any one component may introduce heterogeneity.

The system information management unit takes into account all three components of heterogeneity when determining the pattern of media flow among the various end systems. The degree of involvement of a media data conversion unit in a session is also decided by the system information management unit. The system information management unit takes a global view of total heterogeneity, i.e., all three components are considered, to make an intelligent decision regarding media flow.

This intelligent decision is designed to meet an end user's demand for media consumption, while taking into account the end user's media handling capabilities. As a result, the media handling resources of each end system can be more appropriately used to satisfy user demands regarding media consumption.

The invention comprises a network system in which multiple end systems, system information management units, and at least one media data conversion unit are connected to a network. An end system typically comprises a computer equipped with communication functions, a display, input units (e.g., a keyboard, and a mouse), speakers, and other devices (e.g., a hard disk). The network system is operable to communicate media data sent from sending end systems through any of the media data conversion units to receiving end systems.

When the network system is used as a multi-point video conferencing system, the end system also includes a video camera and a microphone. If needed, additional equipment, such as a device capable of sending characters handwritten on a board (e.g., a white board), may be included.

Before sending or receiving media data, a system information management unit in each end system fetches and stores system information for each end system and for each media data conversion unit.

This system information must include:

End system media data processing capability; and
End system media presentation requirements.

The system user information may also include:

Media data processing capability of the media data conversion unit; and
Media data transmission capability between the end system and the media data conversion unit.

The system information management unit allows media data sent by a sending end system to conform to each of the above requirements at the receiving end system and at the media data conversion unit that controls the receiving end system. These conditions will be referred to as the media data compatibility conditions. For example, the system information management unit determines which media data conversion unit receives media data from which end system, how each media data conversion unit converts the media data it receives from an end system, and to which end systems the media data conversion unit sends the conversion media.

The media data conversion unit obtains settings from the system information management unit. When the media data conversion unit receives media data from a sending end system, e.g., while transmitting media data between the end systems, the media data conversion unit converts the media data into an appropriate format in accordance with such settings. The media data conversion unit then sends the converted media data to the receiving end system.

After the settings are obtained from the system information management unit, system information in the system information management unit is updated in the following cases:

When a new end system is connected to the network or a connected end system is disconnected from the network;

When the media processing capability of a connected end system is changed (for example, when the hardware or software at the end system is changed, or when the relevant hardware or software settings are changed); or When the media data transmission capability between an end system and a media data conversion unit is changed.

Additionally, the media data conversion unit can update system information contained in the system information management unit if a predetermined time period has elapsed since settings were obtained from the system information management unit. In this way, the system information management unit can be updated in a timely manner by an end system or a media data conversion unit to reset the media data compatibility conditions.

If the media data from a sending end system are not converted, it is not necessary for the media data to pass through a media data conversion unit when media data are sent between a sending end system and a receiving end system.

The system information management unit controls the system information in networks that include multiple end systems or several media data conversion units in a batch. One system information management unit is attached to one network system. When multiple small networks are linked to build a large network, a network system according to the invention can be installed in each small network. In this case, the number of system information management units required is equal to the number of small networks.

The network system may include one or more media data conversion units, depending upon the number of end systems that are connected thereto.

A single computer can perform the function of the system information management unit or the media data conversion unit. Further, any of the end systems can perform the function of the system information management unit or media data conversion unit.

FIG. 1 is a block schematic diagram that shows an embodiment of the invention that comprises a video conferencing system. In FIG. 1, five end systems T1 to T5, one system information management unit 31, and two media data conversion units 41, 42 are shown connected to a network 1.

In this embodiment, the media data processing capabilities of the end systems T1 to T5 include video processing capabilities (e.g., frame size, frame rate, video buffer memory capacity) and audio processing capabilities (e.g., CD quality or telephone quality). In addition, user requirements for media presentation at an end system may determine such factors as the number of displays of participant videos and the priority order. Examples of typical settings are shown in Tables 1 and 2.

TABLE 1

Processing capability of the media data in the end systems

| | End system | | | | |
|---|---|---|---|---|---|
| | T1 | T2 | T3 | T4 | T5 |
| Frame size (pixel x pixel) | 1024 x 720 | 900 x 600 | 1024 x 600 | 1024 x 720 | 800 x 400 |
| Frame rate (frames/second) | 30 | 30 | 24 | 24 | 24 |
| Video buffer memory (Mbytes) | 2 | 2 | 4 | 4 | 4 |
| Audio quality (CD audio or telephone audio) | CD | TEL | CD | CD | TEL |

TABLE 2

User demands for media presentation

| | End system | | | | |
|---|---|---|---|---|---|
| | T1 | T2 | T3 | T4 | T5 |
| No. of desired participant displays | 3 | 3 | 2 | 2 | 2 |
| Desired priority order of the participant videos (Mi is the participant video at Ti, where I = 1, 2, ... 5) | M2 M3 M5 M4 | M1 M5 M4 M3 | M1 M2 M4 M5 | M1 M3 M5 M2 | M1 M4 M3 M2 |

In the system shown on FIG. 1, the media data processing capability of the media data conversion units 41, 42 determines the total number of video conference participant images that can be combined. Examples of typical settings are shown in Table 3. Examples of typical transmission capabilities are shown in Table 4.

TABLE 3

Processing capability of the media data conversion units

| Media data conversion unit | 41 | 42 |
|---|---|---|
| No. of possible composite participant videos | 4 | 3 |

TABLE 4

Transmission capability of the media data

| | End system | | | | |
|---|---|---|---|---|---|
| | T1 | T2 | T3 | T4 | T5 |
| Media data conversion unit 41 | Down 10M | Down 10M Up 3M | Down 10M | Down 10M Up 10M | Down 20M Up 20M |
| Media data conversion unit 42 | Down 10M Up 3M | Down 10M | Down 10M | Down 10M Up 10M | Down 20M Up 20M |

The media data transmission capabilities between the end systems T1 to T5 and the media data conversion units 41, 42 determine the transfer rates of a data between end systems.

Table 4 shows the network system bandwidth in bytes per second. For purposes of this discussion, data sent to an end system is referred to as being sent "down," while data sent from an end system is referred to as being sent "up." In the preferred embodiment of the invention, the data transfer rate between T1 and T3 provides a total bandwidth of three million bytes per second.

In operation, before the video conference begins, the system information management unit 31 obtains the system information shown in Tables 1 and 2 from the end systems T1 to T5 and the system information shown in Tables 3 and 4 from the media data conversion units 41, 42.

Based on the above system information, the system information management unit 31 selects either of media data conversion unit 41 or 42 to be responsible for data conversion for the receiving end systems T1 to T5. The media data compatibility conditions for each receiving end system controls media data conversion. Tables 5 and 6 show example settings of these media data compatibility conditions.

TABLE 5

| Media data conversion unit | 41 | 42 |
|---|---|---|
| End system | T1<br>T2<br>T3<br>T5 | T1<br>T4<br>T5 |

TABLE 6

| | End system | | | | |
|---|---|---|---|---|---|
| | T1 | T2 | T3 | T4 | T5 |
| Frame size (pixel × pixel) | 1024 ×<br>720 | 900 ×<br>600 | 1024 ×<br>600 | 1024 ×<br>720 | 800 ×<br>400 |
| Frame rate (frames/second) | 30 | 30 | 24 | 24 | 24 |
| Audio quality (CD audio or telephone audio) | CD/TEL | TEL | CD/TEL | CD/TEL | TEL |
| No. of displays of participant images | 3 | 2 | 2 | 2 | 2 |
| Composite participant videos (Mi is the participant video at Ti, where i =1, 2, . . . 5.) | M2<br>M3<br>M5 | M1<br>M5 | M1<br>M2 | M1<br>M5 | M1<br>M4 |

In this embodiment of the invention, the desired number of people to be displayed on the participant video at the end systems T1 to T3, and the desired priority of the displays of the participants' videos listed in Table 2 are shown on Table 5. Thus, the media data conversion unit 41 is responsible for end systems T1 to T3, and T5. Similarly, the desired number of people to be displayed in the participants' videos of T5, and the desired priority order of the displays of the participants' videos listed in Table 2 are shown on Table 5. Accordingly, the media data conversion unit 42 is responsible for the end systems T1, T4, and T5.

The end systems T1, T3, T4 may have either CD or telephone audio quality. The telephone audio standard cannot be converted to CD audio standard. For example, when the media data conversion unit 41 receives audio data from end system T2 and sends it to end system T1, the audio data is sent in the telephone audio standard (unconverted). In addition, when the media data conversion unit 41 receives audio data from end system T3 and sends it to end system T1, the audio data is sent unchanged in the CD audio standard.

In column T4 in Table 6, M1 and M5 are the composite participant videos. They are first and third in the desired priority order of the display of the participant videos listed in Table 2. The second participant video M3 is not shown in the desired priority order because media data conversion unit 42 does not control the end system T3.

The media data conversion units 41,42 obtain the settings of the media data compatibility conditions shown in Table 6 from system information management unit 3. When the video conference begins, media data conversion unit 41 receives media data from end systems T1, T2, T3, T5. The media data conversion unit 41 conforms to the media data compatibility conditions shown in column T1 in Table 6. The video data from end systems T2, T3, and T5 are combined and converted to video data with a frame size of 720 pixels×1,024 pixels and a frame rate of 30 frames/second. The converted video data are then output to the end system T1. The media data conversion unit 41 also sends unconverted audio data from end systems T2, T3, T5 to end system T1.

Similarly, the media data conversion unit 41 converts and outputs the video data and audio data to end systems T2, T3 in accordance with the media compatible conditions listed in columns T2 and T3 in Table 6.

When the video conference begins, media data conversion unit 42 receives media data from the end systems T1, T4, and T5. Media data conversion unit 42 combines participant videos M1, M5 from end systems T1, T5, converts them to video data having a frame size of 720 pixels×1,024 pixels and a frame rate of 24 frames/second, and outputs the video to the end system T4. In this example, the media data conversion unit 42 does not convert the CD standard audio data from end system T1, but does convert the telephone standard audio data from the end system T5 to the CD standard audio. The media data conversion unit then outputs the audio data to the end system 41.

Similarly, the media data conversion unit 42 converts the video data and audio data in accordance with the media data compatibility conditions listed in column T5 in Table 6 and outputs them to the end system T5.

In the above embodiment of the invention, two media data conversion units are provided and assigned to control a portion of the end systems T1 to T5. In other embodiments of the invention, one media data conversion unit may be provided to control all of the end systems T1 to T5. In addition, two media data conversion units can be provided, e.g., where one media data conversion unit is responsible for converting the video data among all of the end systems, and another media data conversion unit is responsible for audio data conversion among all of the end systems.

Figure 2:
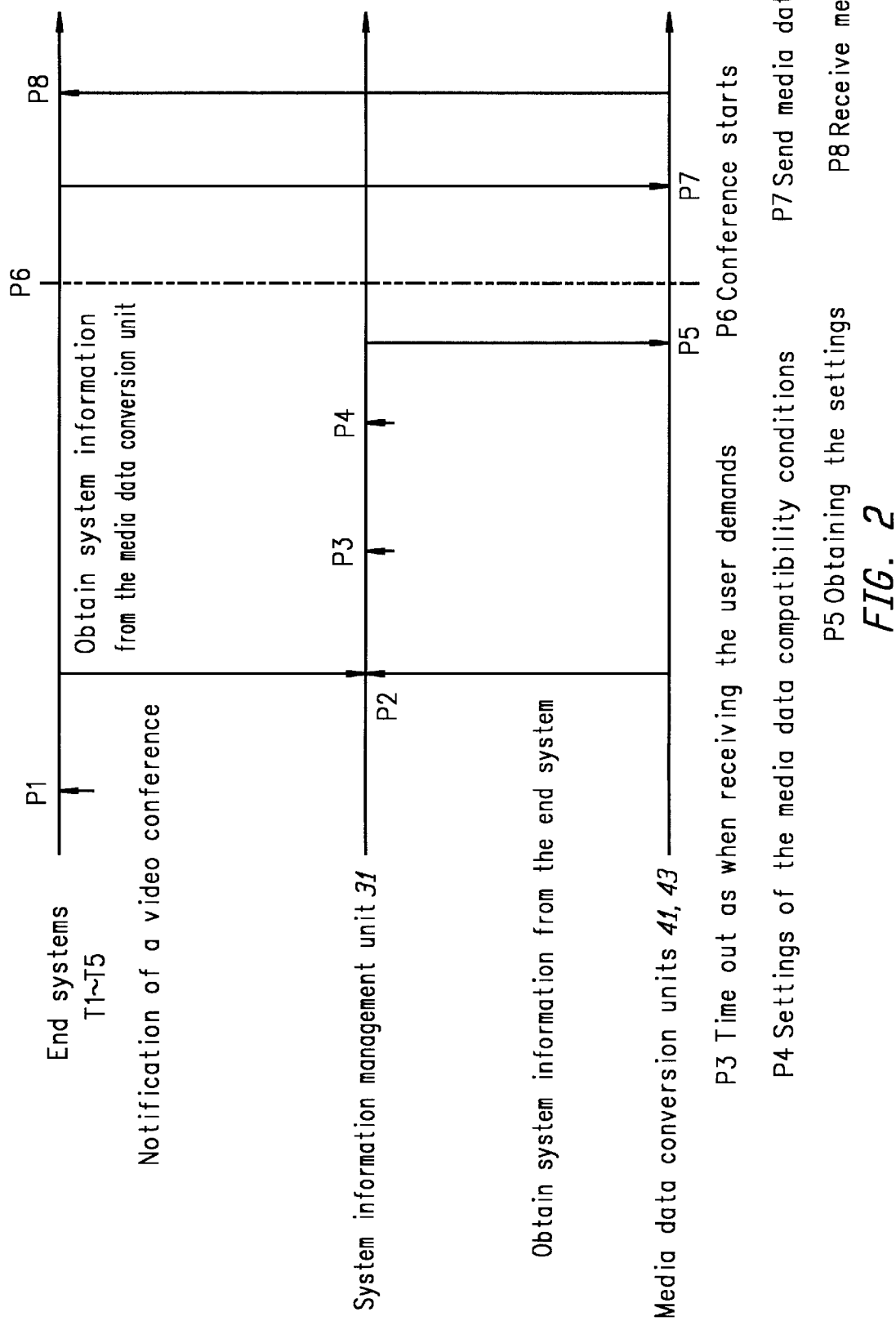
FIG. 2 is a block schematic diagram shows processing flow when the herein disclosed network system is applied to a video conferencing system.

The network system of the invention as applied to a video conferencing system is described further with reference to FIG. 2.

The following processes are performed before sending or receiving media data between end systems:

First, each conference participant (end system user), for example, knows that a conference is notified of the day and time of a conference by electronic mail sent by the system operator, such as the conference organizer (see P1 in FIG. 2).

Next, the system information management unit obtains system information about:

The processing capabilities for the media data in the end systems; and

The user demands on the end system for the media presentation.

This system information is obtained within a specified time before the conference begins by having each conference participant at the end system upload their system information to the system information management unit.

The system information management unit obtains the system information on the following:

The media data processing capability of the media data conversion unit; and

The media data transmission capability between the end system and the media data conversion unit (supplied by the media data conversion unit) (see P2 in FIG. 2).

The system information management unit can also obtain the system information about the transmission capability from the end system.

Specific examples of the system information follow:

Processing capability for media data in the end system:

Name or performance of the central processing unit that is used in the computer system (operating clock);

Main memory capacity;

Name of dedicated chip used in the video processing circuit, circuit performance, and corresponding software performance (e.g., video standards such as MPEG-1 and MPEG-2, minimum and maximum frame sizes, minimum and maximum frame rates, and minimum and maximum depths);

Maximum number of displays for systems in which the videos of multiple conference participants can be simultaneously displayed by the video processing circuit and the corresponding software;

Capacity of the video buffer memory;

Name of the dedicated chip in the audio processing circuit, circuit performance, and performance of the corresponding software (e.g., standard names for CD audio and telephone audio, frequency range, and dynamic range);

Name of the dedicated chip in the communication circuit, circuit performance, and performance of the corresponding software (e.g., minimum and maximum transfer rates, corresponding protocols);

Card names when the above video processing circuit and audio processing circuit are mounted on a video card and/or a sound card;

Name and version of the operating system; and

Names and versions of all software.

Use end system media presentation requirements:

Standard name of the desired video, desired frame size, desired frame rate, desired color depth of the displayed video;

Desired number of images of the participants displayed on the end system, desired priority for which participant image is displayed with priority;

Standard name of the desired audio, desired frequency range, and dynamic range of the output audio;

Desired transfer rate and protocol when sending and receiving media data;

Desired order when the end system sets the priority in the display order of the participant videos of the other end systems; and Information that declares the purpose of the conference when the user of an end system is the conference organizer.

Usually, each of the above demands is represented by a certain range. For example, the standard name for the desired video format is MPEG-2 or MPEG-4, the desired resolution of the displayed image is 720 pixels×400 pixels to 1,024 pixels×800 pixels, and the desired number of displays of the conference participant videos is 2 or 3.

Processing capability for media data in the media data conversion unit:

Number of end systems that can be controlled by a media data conversion unit;

Scale of the displayed image, minimum and maximum frame sizes, minimum and maximum frame rates, and color depths that can undergo video conversion;

Conversion capability of the number of participant videos when used in a video conference (e.g., the maximum number of participant videos that can be combined);

Audio standard name, frequency range, and dynamic range that can undergo audio conversion; and Minimum and maximum transfer rates and corresponding protocol during data transfer.

Media data transmission capability between the end system and the media data conversion unit:

Circuit congestion state between sending end systems and receiving end systems.

After a specific time period has elapsed, the ability of the system to accept user demands times out (see P3 in FIG. 2). Based on the system information, the system information management unit sets the media data compatibility conditions for converting the media data from the sending end system to a format that is compatible with the each of the above listed items for a corresponding receiving end system, as well as the media data conversion unit that controls it.

These media data compatibility conditions include:

The frame size, frame rate, and color depth of the displayed videos;

The output audio standard, the frequency range, and the dynamic range;

The transfer rate and protocol of the media data when transmitting media data; and Which end system is controlled by which media data conversion unit.

Next, the media data conversion unit obtains the settings for the media data compatibility conditions from the system information management unit (see P5 in FIG. 2).

When the conference begins (see P6 in FIG. 2), the following processes are performed while sending and receiving media data between the end systems:

Each end system sends media data to a specific media data conversion unit (see P7 in FIG. 2); and When the media data conversion unit receives media data from a sending end system that controls itself, the conversion unit converts this media data to suitable media data that conform to the settings of the media data compatibility conditions (see P8 in FIG. 2).

If there are many receiving end systems, the media data of the sending end system are converted so that they are compatible with all of the receiving end systems. The media data in the video conference are real-time data that include video and audio data. The data are converted in parallel with reception of the media data.

Occasionally, an end system is added to the network after the media data conversion unit obtains the settings from the system information management unit; or the processing capability of the end system or media data conversion unit is changed; or the transmission capability of the media data between the end system and the media data conversion unit is changed. In this case, the system information of the system information management unit may be updated and the media data compatibility condition may be reset, if desired.

Also, the video conferencing organizer, who is the system operator, can change a part of the system information in the system information management unit (for example, the number of participant videos desired by the user at the end system) and a part of the media compatibility condition (for example, the number of participant videos displayed on an end system, or priority order of the displays of the participant videos).

Although the invention is described herein with reference to the preferred embodiment, one skilled in the art will readily appreciate that other applications may be substituted for those set forth herein without departing from the scope of the present invention. Accordingly, the invention should only be limited by the Claims included below.

We claim:

1. A network system, comprising:

a media data conversion unit;

end systems including a sending end system capable of transmitting media data and at least two receiving end systems capable of receiving media data, each of said end systems being connected to a network across which said sending end system transmits media data through said media data conversion unit to said at least two receiving end systems: and a system information management unit for:

receiving system information from each one of said end systems and said media data conversion unit, said system information received from said one of said end systems including:

end system media data processing capability information; and a user media presentation requirement specifying a user's preference for presentation of said media data by said one of said end systems, and determining media data conversion settings for said media data conversion unit in response to said system information; in which:

said media data conversion unit operates in response to said media data conversion settings determined by said system information management unit to receive said media data from said sending end system, to convert said media data into converted media data that are in accordance with said system information for said at least two receiving end systems and to transmit said converted media data to said at least two receiving end systems.

2. The network system of claim 1, in which said system information additionally includes at least one of:

media data conversion unit processing capability; and media data transmission capability between said end systems and said media data conversion unit.

3. The network system of claim 1, additionally comprising an additional media data conversion unit connected to said network, said media data unit and said additional media data unit transmitting different converted media data to different ones of said end units.

4. The network system of claim 3, in which said system information management unit is additionally for determining an assignment of said end systems to said media data conversion units.

5. The network system of claim 1, said system comprising a multi-point video conferencing system.

6. The network system of claim 5, in which said media data are real-time data containing video data and audio data.

7. In a network system, a method for reducing the load on end systems connected to the network and on the network by efficiently transmitting and receiving media data when user demands for said media data, end system processing capability, and media presentation format differ at ones of said end systems, said method comprising:

connecting end systems, a system information management unit, and a media data conversion unit to a network, said end systems including a sending end system capable of transmitting media data and at least two receiving end systems capable of receiving media data;

receiving system information for each one of said end systems and said media data conversion unit using said system information management unit, said system information for said one of said end systems including:
end system media data processing capability information, and a user media presentation requirement specifying a user's preference for presentation of said media data by said one of said end systems;

determining media data conversion settings for said media data conversion unit in response to said system information using said system information management unit;

receiving said media data from said sending end system at said media data conversion unit;

in response to said media data conversion settings, converting said media data to converted media data using said media data conversion unit, said converted media data according with said system information for said at least two receiving end systems; and transmitting said converted media data to said at least two receiving end systems from said media data conversion unit.

8. The method of claim 7, additionally comprising updating said system information management unit in any of the following cases:

when a new end system is connected to said network or a connected end system is disconnected from the network;

when the media processing capability of a connected end system is changed; or when the media data transmission capability between one of said end systems and said media data conversion unit is changed.

9. The method of claim 7, additionally comprising setting said media data conversion unit to update said media data conversion settings from said system information management unit when a predetermined time period has elapsed since previously obtaining said settings from said system information management unit.

10. The method of claim 7, in which said system information additionally includes at least one of:

media data conversion unit processing capability; and media data transmission capability between said end system and said media data conversion unit.

11. The method of claim 7, in which:

in connecting said end systems, said media data conversion unit and said system information management unit to said network, an additional media data conversion unit is additionally connected to said network:

in transmitting said converted media data to said at least two receiving end systems from said media data conversion unit, first converted media data are transmitted from said media data conversion unit to said at least two receiving end systems; and said method additionally comprises transmitting second converted media data, different from said first converted media data, from said additional media data conversion unit to at least one other of said end systems capable of receiving media data.

12. The method of claim 11, additionally comprising determining an assignment of said end systems to said media data conversion units using said system information management unit.

13. The method of claim 7, in which said network system comprises a multi-point video conferencing system.

14. The method of claim 13, in which said media are real-time data containing video data and audio data.

* * * * *